United States Patent

[11] 3,594,920

| [72] | Inventor | Thomas J. Kordewick<br>138 W. Naperville Road, Westmont, Ill. 60559 |
|---|---|---|
| [21] | Appl. No. | 744,026 |
| [22] | Filed | July 11, 1968 |
| [45] | Patented | July 27, 1971 |

[54] DRIVING INSTRUCTION FOR PERSONS WITH A HEARING HANDICAP
3 Claims, 6 Drawing Figs.

[52] U.S. Cl..................................................... 35/11
[51] Int. Cl.................................................... G09b 9/04
[50] Field of Search............................................ 35/11;
40/129 C, 132 D; 116/28, 30, 31; 180/77 C;
307/10; 340/124, 125

[56] References Cited
UNITED STATES PATENTS
1,033,572  7/1912  Fortmann..................... 40/132 D
1,292,655  1/1919  Silverman..................... 40/132 D
1,896,495  2/1933  O'Donnell..................... 340/124

*Primary Examiner*—William H. Grieb
*Attorney*—Pendleton, Neuman, Williams & Anderson ABSTRACT: A method and apparatus for teaching driving to students having a hearing deficiency in a student-instructor relationship wherein an instructional signal device having visually indicated instructions thereon is mounted in the normal front visual line-of-sight of the driver in an automotive vehicle and a control means connected to the instructional signal for operation by the instructor, wherein preselected individual driving instructions are indicated to the student on the instructional signal device activated by the instructor.

PATENTED JUL 27 1971
3,594,920
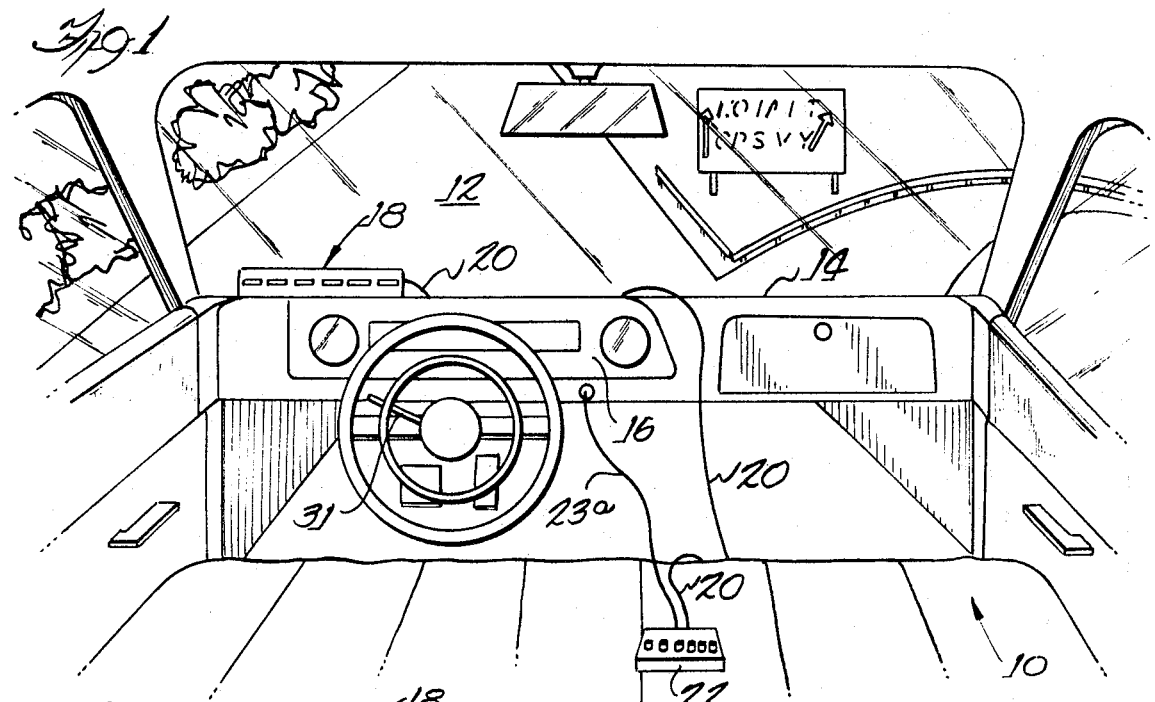
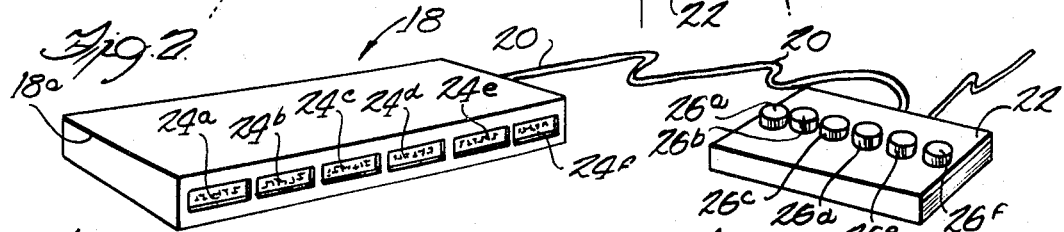
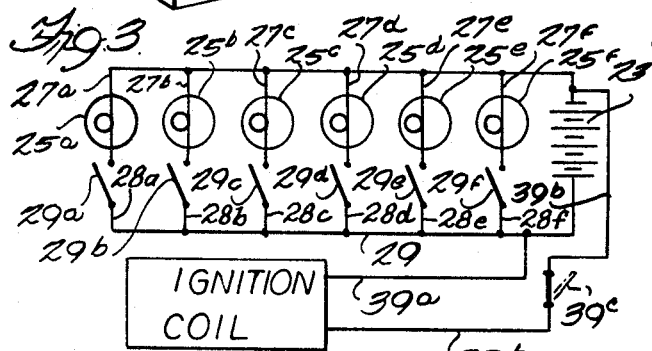
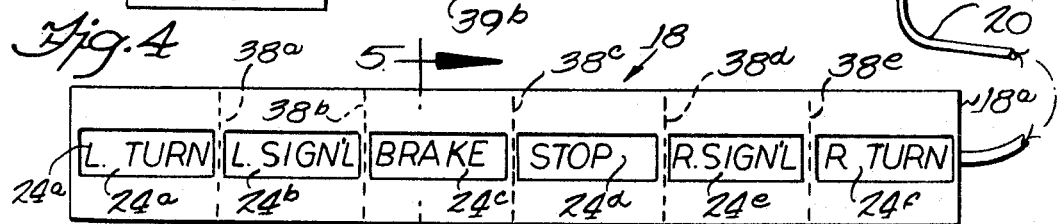
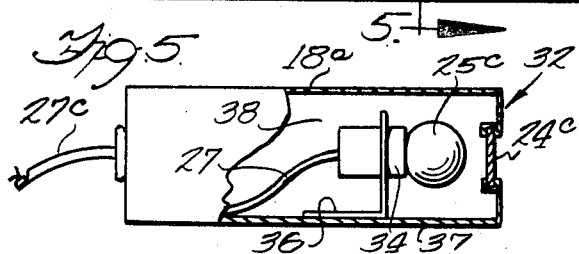
Inventor
Thomas J. Kordewick
by Pendleton Neuman
Seibold & Williams
Attys

DRIVING INSTRUCTION FOR PERSONS WITH A HEARING HANDICAP

BACKGROUND OF THE INVENTION

The teaching of deaf students or those with a hearing deficiency presents situations which require special techniques. In the teaching of driving in the customary student-instructor relationship, the student is in the driver seat and the driver is beside him in the passenger seat. With persons who are without any hearing deficiency or impairment, the customary driving instruction are all verbal or auditory. In the case of the deaf student or those with a severe hearing impairment, the instructions must be communicated in some other manner. Customarily the deaf or those with a substantial hearing impairment, rely strongly on lip reading to obtain the intelligence sought to be communicated. In teaching automotive driving this requires the instructor to tap the student on the shoulder or otherwise get his attention. The student then had to turn to the instructor to visually perceive the verbal instructions and the instructor had to wait until the student had his attention directed to the instructor before issuing the instructions. This sequence, of course, required the student to take his eyes away from the rod, which in a novice driver, or for that matter anyone, is a dangerous practice which could lead to accidents. The time lapse in the instructional sequence likewise was undesirable, since the particular sequence of instruction was broken, making the instruction educational process with this type of student unusually extended and, perhaps, unsatisfactory insofar as the goal of competent driving was concerned.

SUMMARY OF THE INVENTION

This invention relates to a method for teaching driving to students having a hearing deficiency in a student-driver relationship wherein an instructional signal device having visually indicated instructions thereof is mounted in the normal front visual line-of-sight of the driver of an automotive vehicle and a control means connected to the instructional signal operated by an instructor in which visual driving instructions are indicated to the student on the instructional signal device by activation by the instructor.

The invention also relates to an apparatus where visually indicating driving instructions which apparatus comprises a preselected series of instructions which are indicated by means of signal lights which are electrically activated to a control device containing a plurality of means whereby electrical signals can be generated to activate the signal device and means for transmitting the electrical signal from the control device to the signal device.

BRIEF DESCRIPTION OF THE DRAWING

FIG. 1 is a partial perspective view of an automobile interior showing the apparatus used in the instruction method of this invention mounted above the dashboard in the instructional relationship;

FIG. 2 is a perspective view of one embodiment of the apparatus of the present invention shown in an unmounted condition;

FIG. 3 is a circuit diagram of the apparatus of this invention;

FIG. 4 is a front elevation view of the signal box illustrated in FIGS. 1 and 2;

FIG. 5 is a sectional view taken along the line 5—5 of FIG. 4, and

FIG. 6 is a top plan view of another embodiment of a signal box made in accordance with this invention.

Referring to FIG. 1 of the drawings, there is illustrated an automotive body interior 10, windshield 12, a shelf 14 which lies over the dashboard 16. An instructional signal device 18 interconnected with a cable 20 to a control box or device 22 is also illustrated. As installed the signal device 18 is mounted on the shelf 14 directly in front of the driver's seat in an automotive vehicle essentially in the visual line-of-sight for ordinary driving. The control means 22 connected by cable 20 to the signal box extends over to the passenger seat adjacent the driver in which the instructor is seated.

Referring to FIGS. 2—4 and 5, the apparatus used in the instructional method of this invention is illustrated in perspective, front elevation and sectional views. In signal device 18 a plurality of signal light panels 24a, 24b, 24c, 24e, and 24f are illustrated mounted in a housing 18a and bearing appropriate legends as shown adapted for driving instruction. These are respectively left turn, left signal, brake, stop, right signal and right turn. Each of the signal light panels is illustrated by a light 25c (see FIG. 5) interconnected with a power source as illustrated in FIG. 3 and a control box 22. The control box 22, includes a plurality of switches in the form of push buttons 26a, 26b, 26c, 26d, 26e, and 26f. The cable means 20 provides a plurality of independent circuits which are completed by pushing the appropriate pushbutton switch or switches for the appropriate instruction in which current from a battery or other electrical source is permitted to flow through the signal light corresponding to the instructional button in the signal light corresponding to the instructional button in the signal device 18.

FIG. 3 is a circuit diagram of the apparatus used in the method of the present invention. This diagram illustrates schematically a plurality of signal lights 25a, 25b, 25c, 25b, 25e and 25f. These lights are connected by leads 27a, 27b, 27c, 27d, 27e and 27f to a power source or battery 23. Leads 28a, 28b, 28c, 28d, 28e and 28f lead from each light to the power source to complete the circuit and are respectively interrupted by control switches 29a through 29f. These switches correspond to the push buttons 26a through 26f shown in FIG. 2 of the drawing. Appropriate legends are indicated on each of the signal panels 24a through 24f. As shown in FIG. 4 of the drawings, in signal device 18 the abbreviated legend "L. Turn" appears on the signal panel 24a. The instruction left signal (abbreviated) "L. Sig'l" appears on the signal panel 24b and others appear in succession over the signal lights 24c through 24f. In FIG. 5 there is illustrated in section, a cell 32 of the housing 18a having a light 25c, light socket 34 and mounting bracket 36 secured to the bottom surface 37 of housing 18a. A wall 38c separates one side of the cell or chamber of FIG. 5 from the adjacent chamber. The cells are defined by a series of walls 38a through 38e shown as hidden lines in FIG. 4. The signal panel 24c of FIG. 5 and the other signal panels are of a light-transmitting material such as translucent plastic. The written instruction is printed or otherwise affixed to the face of the panel and may be so incorporated so that it is invisible except when illuminated from the rear by a light such as 25c.

In the circuit diagram FIG. 3, there is also illustrated an additional optional circuit which controls power to the ignition coil via leads 39a and 39b with switch 39c. This would permit the instructor to cut engine ignition power in an emergency. In FIG. 1 there is shown a power supply cable 23a, which can be connected to the cigar lighter of the car so that separate power batteries are not required. The instructor at the commencement of the instructional period would seat himself in the passenger seat next to the student driver. After a period of indoctrination the student would have been apprised of the mode of instruction and the signals which would be communicated to him by the instructor in the visual device 18. To issue the instruction to turn left the instructor would merely press the "left" signal switch button whereupon the student would in response to the command activate the left turn signal (31) of the automotive vehicle. Other instructions, such as, "Reverse," "Left Turn" or "Right Turn" can be indicated by the instructor as the occasion arises during the teaching session.

It has been found that by using the method of this invention, student drivers who have a hearing handicap have been able to reduce their instructional driving time to a very small fraction of what was originally required in those instances where purely verbal instructions accompanied by lip reading were issued. In addition, the time lapse which ordinarily occurred with previous instruction methods was eliminated and the quality of the driver produced by the training session was substantially improved over the old techniques that were employed in the past. It can be appreciated that other visual signal arrangements can be employed in place of the device which is illustrated herein. For example, in FIG. 6 there is illustrated a device in which a series of signal lights 41 such as pilot lights are activated by a current in closure of the switches. The legends are printed on the housing face. Again while the apparatus illustrated in FIG. 2 is specific to the use of six general instructional signals, they can if desired, be multiplies by the addition of more signal panels and more detailed instructions, including for example slow down, accelerate, park, etc. and each signal light or panel may be appropriately colored i.e. red for stop, green for go.

During instruction it may be desired to give several instruction at once such as left signal and left turn or left turn and brake. In this case two signal switches or buttons can be closed or depressed at the same time.

While pushbutton switches are satisfactory certain other instructional sequences might require switches which remain closed when depressed and are released or opened by a second depression.

While several particular embodiments of this invention have been illustrated, it will be understood that this invention is not limited thereto but other embodiments may be devised which will accomplish the basic purpose of providing visual instructional signals for a student driver who has a hearing handicap.

I claim:
1. A method for teaching automotive vehicle driving to students having a hearing deficiency in a student-instructor relationship which comprises the steps of:
   a. maintaining an instructional signal device having a plurality of visually indicated instructions thereon mounted on a normal front-visual line-of-sight of a student driver in an automotive vehicle, said instructions adapted to be individually activated;
   b. providing a control means at an instructor's position in said vehicle, said position being out of the line-of-sight of the student driver, said control means having a plurality of switches each electrically connectable to one of said instructions on said device;
   c. and selectively closing said switches by an instructor to activate the corresponding instructions in the signal device according to a driving sequence selected by the instructor.

2. A method according to claim 1 which comprises visually transmitting the instructions to the student by electrical illumination means activated by the switches of said control means.

3. A method according to claim 1 which comprises providing a control means at the instructor's position which includes a switch for breaking the circuit of an automotive ignition system.